United States Patent [19]

Kirschner et al.

[11] Patent Number: 4,923,092
[45] Date of Patent: May 8, 1990

[54] BINARY SYRUP METERING SYSTEM FOR BEVERAGE DISPENSING

[75] Inventors: Jonathan Kirschner, Powder Springs; Robert D. Hughes, IV, Atlanta, both of Ga.

[73] Assignee: The Coca-Cola Company, Atlanta, Ga.

[21] Appl. No.: 221,806

[22] Filed: Jul. 20, 1988

[51] Int. Cl.$^5$ .............................................. B67D 5/56
[52] U.S. Cl. ................... 222/129.4; 222/136; 222/145; 137/100
[58] Field of Search ............... 222/129.1–129.4, 222/136, 145; 137/98, 100, 111, 500

[56] References Cited

U.S. PATENT DOCUMENTS

| | | | |
|---|---|---|---|
| 2,745,252 | 5/1956 | Reese | 60/54.5 |
| 2,880,912 | 4/1959 | Fisher | 222/129.4 |
| 2,983,279 | 5/1961 | Biermann | 137/100 |
| 3,011,685 | 12/1961 | Barron | 222/249 |
| 3,033,218 | 5/1962 | Callen | 137/99.5 |
| 3,087,004 | 4/1963 | Thorsheim | 136/86 |
| 3,369,755 | 2/1968 | Roden et al. | 222/129.2 X |
| 3,640,433 | 2/1972 | Rodth | 222/129.2 |
| 3,727,627 | 4/1973 | Bird et al. | 137/100 |
| 3,807,426 | 4/1974 | Henes | 137/100 |
| 3,825,027 | 7/1974 | Henderson | 137/265 |
| 3,957,073 | 5/1976 | Barnum | 137/87 |
| 4,014,461 | 3/1977 | Harvill | 222/94 |
| 4,095,610 | 6/1978 | Priesmeyer | 137/100 |
| 4,204,538 | 5/1980 | Cannon | 128/214 R |
| 4,324,267 | 4/1982 | Bach | 137/100 |
| 4,356,937 | 11/1982 | Simon et al. | 222/129.2 |
| 4,467,834 | 8/1984 | Rochat et al. | 137/637 |
| 4,753,370 | 6/1988 | Rudick | 222/129.1 X |

Primary Examiner—Joseph J. Rolla
Assistant Examiner—David H. Bollinger
Attorney, Agent, or Firm—Eduardo M. Carreras; W. Dexter Brooks

[57] ABSTRACT

A binary syrup system for beverage dispensing including a pair of syrup containers holding different syrup components, a metering device with two inlets connected one to each container and a single syrup outlet connected to a dispenser. The metering device includes a flow channel therethrough for each component, a diaphragm device for equalizing the pressure in each channel, and a metering orifice downstream from the diaphragm device. This pressure equalization in combination with the metering orifices provides the necessary flow control and a constant predetermined volumetric ratio of the two syrup components when mixed to form the complete syrup.

10 Claims, 2 Drawing Sheets 4,923,092

BINARY SYRUP METERING SYSTEM FOR BEVERAGE DISPENSING

BACKGROUND OF THE INVENTION

This invention relates to beverage dispensing systems and in particular to a binary syrup system in which the syrup is provided in two separate containers holding two different syrup components rather than being provided in one single container. This keeps certain component(s) separated from certain other components, until just prior to dispensing, when the two components are combined to form the complete syrup.

A large number of beverage dispensing systems are known for use with both sugar syrups and diet syrups, and for use with various types of syrup containers such as pressurized tanks (figals) and non-pressurized plastic bags (bag-in-box) used in conjunction with syrup pumps.

It is an object of this invention to provide a binary syrup system for a beverage dispenser.

SUMMARY OF THE INVENTION

A binary syrup system for beverage dispensing in which the syrup is provided in two different components (components A and B) stored in separate containers, preferably a bag-in-box system using two two and one-half gallon bags placed in a single box. The two components are preferably combined in the ratio of 1:1 and the complete syrup is then fed to the dispenser for use as in the prior art.

In the preferred embodiment, the syrup is a diet soft drink syrup using aspartame as the artificial sweetener. It has been found that aspartame loses some of its sweetness over time if it is in an acid solution (which the syrup is). In this invention, the aspartame is in component A and at least most of the acid is in component B so as to at least retard the degradation of the sweetener.

The binary syrup system of the preferred embodiment of this invention includes the combination of a bag-in-box syrup container including two separate two and one-half gallon bags, a metering device, a syrup pump, and a beverage dispenser. The prior art system includes a single bag-in-box container with a single bag, a syrup pump and a beverage dispenser. The system of the present invention, because it uses two separate syrup containers, requires the additional equipment of a metering device to ensure that components A and B are combined in the correct ratio to form the complete syrup which is then fed to the pump and to the dispenser.

The metering device of the present invention includes a housing a pair of inlet ports, a single outlet port, and a pair of separate flow channels in liquid communication with a respective one of said inlet ports; pressure equalizing means in said flow channels for compensating for pressure differences in said flow channels and for providing an equal pressure section in each of said flow channels downstream from said pressure equalizing means; a metering orifice in each of said flow channels downstream from respective ones of said equal pressure sections; and means for combining said flow channels into a single flow conduit for the complete syrup, said flow conduit feeding syrup to said outlet port, whereby flow of two separate syrup components can be controlled and combined into a complete syrup having a constant predetermined volumetric ratio of the two syrup components.

An important feature of this invention is that the metering device is on the suction side of the syrup pump and relies on vacuum to create the flow controlling $\Delta p$ (pressure differential).

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENT

Figure 1:
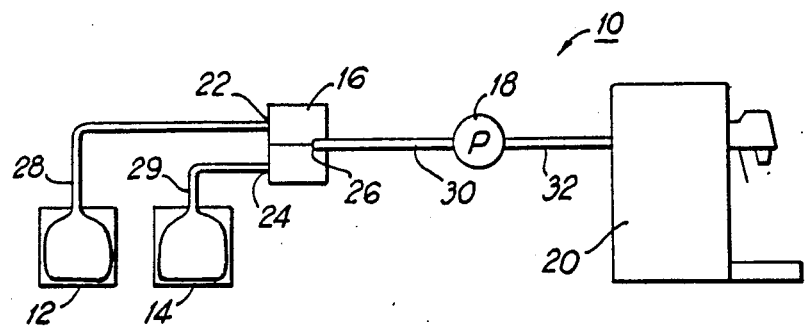
FIG. 1 is a diagrammatic view of the preferred embodiment of the present invention.
Figure 2:
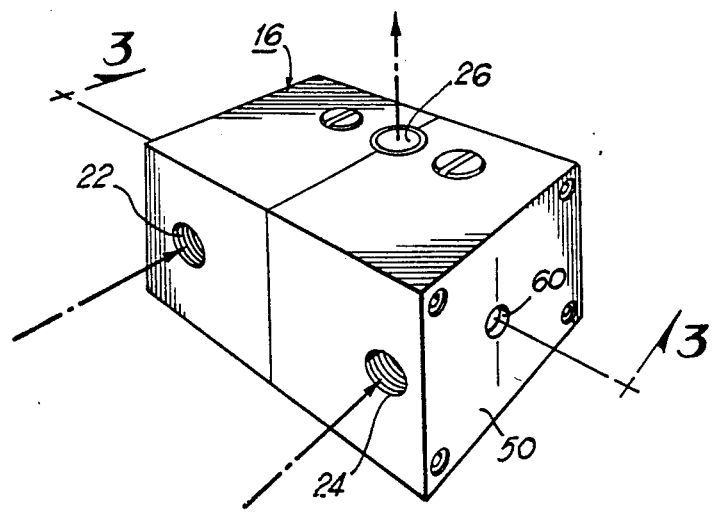
FIG. 2 is a perspective view of the metering device of this invention.
Figure 3:
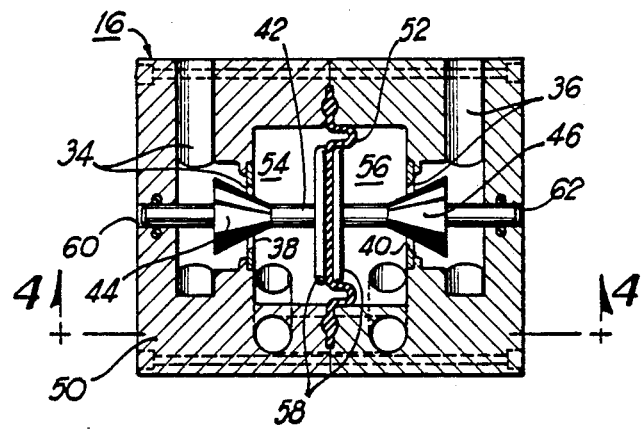
FIG. 3 is a cross-sectional view through the device of FIG. 2 taken along lines 3—3 thereof.
Figure 4:
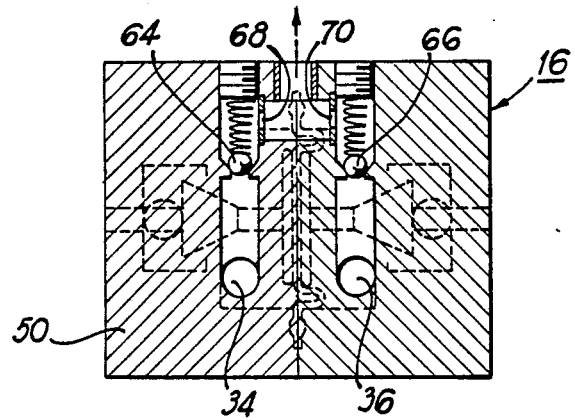
FIG. 4 is a cross-sectional view through the device of FIG. 3 taken along line 4—4 thereof.

With reference now to the drawings, FIGS. 1-4 show the preferred embodiment of this invention of a binary syrup system 10 including a pair of bag-in-box syrup bags 12 and 14 each holding a different component of the syrup (components A and B), a metering device 16, a syrup pump 18 and a beverage dispenser 20. The metering device 16 includes two inlet ports 22 and 24, one for each of the components A and B, and a single outlet port 26 for the complete syrup formed when components A and B are mixed in the correct ratio. Conduits 28 and 29 connect the containers 12 and 14 to the metering device 16, conduit 30 connects the metering device to the pump, and conduit 32 connects the pump to the dispenser. Any well-known bag-in-box, pump and dispenser can be used in this system. Although FIG. 1 shows, for ease of understanding, two separate boxes holding two separate bags, the preferred arrangement is a single box holding the two separate bags.

The key to this system is the metering device 16 connected to the suction side of a syrup pump. This metering device includes two liquid passageways or flow channels 34 and 36 therethrough from the two inlet ports 22 and 24, respectively, means for equalizing the pressure of the two liquids, and a metering orifice 68 and 70 in each flow channel downstream from an equal pressure section of each channel. The pressure equalizing means includes a throttling orifice 38 and 40 in each channel in combination with a single movable throttle member 42 having throttle elements 44 and 46 positioned in the orifices 38 and 40, respectively.

In the preferred embodiment, the specific metering device 16 includes a housing 50 having a central chamber divided by a movable diaphragm 52 into equal pressure chambers 54 and 56 (these chambers are the equal pressure sections of the two flow channels 34 and 36). The throttle member 42 is connected to the diaphragm 52 by plates 58 and is accurately positioned in the throttle orifices 38 and 40 by guide holes 60 and 62. The throttle member 42 moves in response to pressure differences acting thereon such that movement of the tapered throttle elements will reduce the area of one orifice while simultaneously increasing the area of the other orifice to provide automatic pressure equalization in the section of the flow channels immediately downstream from the throttle orifices. Thus, any differences in pressure between the two liquids upstream from the throttle elements 44 and 46 will be compensated for by the movement of the throttle member 42, such that the pressure in chambers 54 and 56 will be the same.

As mentioned above, each of the flow channels includes a metering orifice 68 and 70 downstream from the equal pressure chambers 54 and 56. The two flow channels merge or combine downstream from the two metering orifices to form a single flow conduit 71 for the complete syrup which then flows out of the metering device through outlet port 26. The metering orifices are preferably precision openings in stainless steel discs. These metering orifices, in combination with the pressure equalizing means, provides for controlled flow and a constant predetermined volumetric ratio of the two syrup components in the complete syrup flowing out of the metering device and into conduits 30 and 32.

The passageways 34 and 36 also each include a check valve 64 and 66, respectively. The check valves prevent the flow of syrup back into the metering device.

The metering device 16 also provides an automatic, built-in, sold-out feature. That is, when one bag is empty, the throttle member will move completely to one side shutting off the flow from the other bag, and because the one bag is empty, there will be no flow through the single outlet conduit 30. Thus, if one bag empties before the other, no further drinks can be dispensed.

Figure 5:
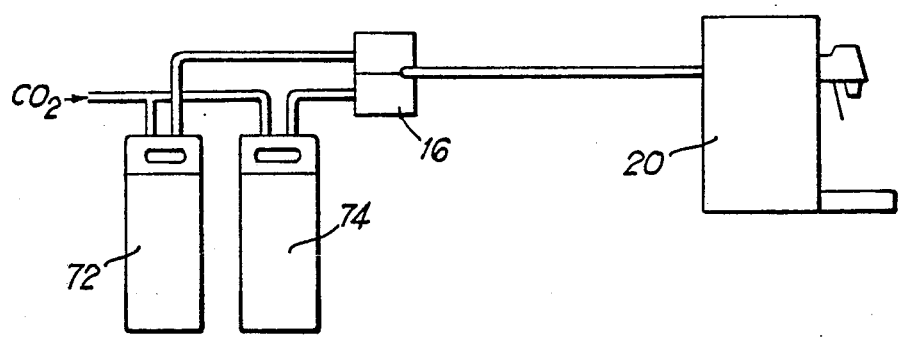
FIG. 5 is a diagrammatic view of another embodiment of the present invention.

FIG. 5 shows another embodiment of the present invention wherein the syrup is provided in two separate figals 72 and 74 rather than in two bag-in-box containers. In this case, no syrup pump is needed.

The present invention can be used with two syrup components in other ratios than 1:1. For example, one of the containers can have four gallons and the other can have one gallon. In such case, the orifices 68 and 70 would have to be replaced with other orifices having different sized openings.

While the preferred embodiments of this invention have been described above in detail, it is to be understood that variations and modifications can be made therein without departing from the spirit and scope of the present invention. For example, other constructions of the metering device can be used, if desired. Also, while the preferred embodiment separates an artificial sweetener from at least most of the acid, this invention can alternatively be used to keep other components separated, such as certain flavor ingredients. It is noted that the metering orifices 68 and 70 and/or the check valves 64 and 66 can be in a separate unit from the housing 50.

What is claimed is:

1. A binary syrup system for beverage dispensing from two separate containers each holding a different syrup component comprising:
   (a) a syrup metering device including a housing having a pair of inlet ports, a single outlet port, and a pair of separate flow channels in liquid communication with a respective one of said inlet ports;
   (b) movable pressure equalizing means in said flow channels for compensating for pressure differences in said flow channels and for providing an equal pressure section in each of said flow channels downstream from said pressure equalizing means;
   (c) a metering orifice in each of said flow channels downstream from respective ones of said equal pressure sections;
   (d) means for combining said flow channels into a single flow conduit for the complete syrup, said flow conduit feeding syrup to said outlet port, whereby flow of two separate syrup components can be controlled and combined into a complete syrup having a constant predetermined volumetric ratio of the two syrup components;
   (e) a suction pump with the suction side thereof connected to said outlet port; and
   (f) a beverage dispenser with a syrup conduit connected to the other side of the suction pump.

2. The binary syrup system for beverage dispensing as recited in claim 1 including a pair of bag-in-box syrup bags connected one each to the respective ones of said inlet ports.

3. The binary syrup system for beverage dispensing as recited in claim 1 including a check valve in each of said flow channels upstream of said metering orifices and downstream from said pressure equalizing means.

4. The binary syrup system for beverage dispensing as recited in claim 3 wherein said pressure equalizing means includes a throttle orifice in each flow channel, and a throttle element positioned in each throttle orifice, said throttle elements being connected to a movable diaphragm such that said throttle elements will move in response to pressure differences acting thereon and such movement of said elements will reduce the area of one throttle orifice while increasing the area of the other throttle orifice.

5. A binary syrup system for beverage dispensing comprising:
   (a) a pair of syrup containers each holding a different syrup component of a beverage syrup;
   (b) a beverage dispenser;
   (c) a metering device having two inlet ports connected one to each of said containers, and having a single common outlet port connected to said beverage dispenser, said metering device including; (i) a pair of flow channels, one from each inlet port, (ii) a throttling orifice in each of said flow channels, (iii) a throttle member including a pair of throttle elements positioned one in each of said orifices, such that said throttle member moves in response to pressure changes thereon to reduce the area of one throttle orifice while simultaneously increasing the area of the other throttle orifice to provide automatic pressure equalization downstream from said throttle orifices, and (iv) a metering orifice in each of said flow channels downstream from said respective throttling orifices, which, in combination with said throttling orifices, provides controlled flow and a constant predetermined volumetric ratio of the two syrup components; and
   (d) a check valve disposed in each of said flow channels downstream of said respective throttling orifices and upstream of said respective metering orifices, whereby the syrups in the single common outlet port cannot contaminate the syrups in the flow channels.

6. A binary syrup system for beverage dispensing comprising:
   (a) a metering device including a housing having a chamber therein divided by a movable diaphragm into two separate chambers A and B forming a pair of flow channels;

(b) an inlet port A in said housing into chamber A for syrup component A;

(c) an outlet port A in said housing from chamber A for syrup component A;

(d) an inlet port B in said housing into chamber B for syrup component B;

(e) an outlet port B in said housing from chamber B for syrup component B;

(f) a first wall having a first throttling orifice therethrough in chamber A dividing chamber A into an inlet section and an outlet section;

(g) a second wall having a throttling orifice therethrough in chamber B dividing chamber B into an inlet section and an outlet section;

(h) a throttle member connected to said diaphragm and including a first throttle element movably positioned in said first throttling orifice, and a second throttle element movably positioned in said second throttling orifice, such that said throttle member moves in response to pressure changes in said chambers such that movement in one direction opens up one orifice while simultaneously closing down the other orifice;

(i) a metering orifice in each of said flow channels downstream from said throttle orifices, which, in combination with the pressure equalization provided by said throttle orifices, provides controlled flow and a constant predetermined volumetric ratio of the two syrup components;

(j) a conduit A connected to outlet port A providing with outlet port A a fluid passageway A, and a conduit B connected to outlet port B providing with outlet port B a fluid passageway B; and (k) a check valve in each of said passageways A and B, said check valves preventing back-flow of fluid into said metering device.

7. The binary syrup system for beverage dispensing as recited in claim 6 including a pair of bag-in-box bags, one connected to one each of said inlet ports, a single syrup conduit connected at one end to both conduits A and B and at the other end to the suction end of a syrup pump, and said syrup pump being connected to a beverage dispenser.

8. A method for preventing degradation of a syrup component in a beverage dispensing system comprising:

(a) storing the syrup in tow separate liquid syrup containers, one having the degradable ingredient and the other having at least most of the degrading ingredient;

(b) connecting each container to separate inlet ports of a metering device and connecting a common outlet port from said device to a conduit connected to the suction side of a vacuum pump;

(c) controlling the flow through said metering device such that the liquid fed from the device out said common outlet port includes liquid from each of said containers in a constant, predetermined volumetric ratio and;

(d) preventing the flow of liquid from said outlet common port into the metering device.

9. The method as recited in claim 8 in which said controlling step comprises feeding each of said liquids through a separate flow channel each having a throttling orifice therein and each orifice having a movable throttle element therein, connecting said elements together such that said elements will move in response to pressure differences acting thereon and such that movement of said elements will reduce the area of one throttle orifice while simultaneously increasing the area of the other throttle orifice to provide automatic pressure equalization, and then feeding each of said liquids through a metering orifice to control the flow and to provide a constant predetermined volumetric ratio of the two syrup components.

10. The method as recited in claim 8 in which said controlling step comprises providing a flow channel section in said metering device for each liquid having the same pressure, and feeding the liquid out from each of said sections through a separate metering orifice and then combining the two liquid components downstream from said metering orifices into a complete syrup to provide a constant predetermined volumetric ratio of the two syrup components in said complete syrup.

* * * * *